(12) United States Patent
Winick et al.

(10) Patent No.: US 9,137,939 B2
(45) Date of Patent: Sep. 22, 2015

(54) ELECTRIC ADJUSTING APPARATUS FOR ROW CLEANERS

(71) Applicants: Alan E. Winick, Wellington, CO (US); Jerry L. Groff, Imperial, NE (US)

(72) Inventors: Alan E. Winick, Wellington, CO (US); Jerry L. Groff, Imperial, NE (US)

(*) Notice: Subject to any disclaimer, the term of this patent is extended or adjusted under 35 U.S.C. 154(b) by 0 days.

(21) Appl. No.: 14/187,382

(22) Filed: Feb. 24, 2014

(65) Prior Publication Data
US 2014/0262377 A1   Sep. 18, 2014

Related U.S. Application Data

(60) Provisional application No. 61/787,087, filed on Mar. 15, 2013.

(51) Int. Cl.
| A01C 7/20 | (2006.01) |
| A01B 63/00 | (2006.01) |
| A01C 7/00 | (2006.01) |

(52) U.S. Cl.
CPC .............. *A01B 63/008* (2013.01); *A01C 7/006* (2013.01); *A01C 7/203* (2013.01)

(58) Field of Classification Search
CPC ........ A01C 7/203; A01C 7/205; A01B 63/30; A01B 63/24; A01B 36/16; A01B 63/008; Y10S 111/927
See application file for complete search history.

(56) References Cited

U.S. PATENT DOCUMENTS

| 4,294,181 | A | * | 10/1981 | Smith | 111/157 |
| 4,580,507 | A | * | 4/1986 | Dreyer et al. | 111/73 |
| 4,603,645 | A | * | 8/1986 | Wiemeyer | 111/187 |
| 4,694,759 | A | * | 9/1987 | Dreyer et al. | 111/151 |
| 4,726,304 | A | * | 2/1988 | Dreyer et al. | 111/73 |
| 5,129,282 | A | | 7/1992 | Bassett et al. | |
| 5,152,349 | A | | 10/1992 | Roden | |
| 5,234,060 | A | * | 8/1993 | Carter | 172/413 |
| 5,341,754 | A | | 8/1994 | Winterton | |
| 5,461,995 | A | | 10/1995 | Winterton | |
| 6,253,692 | B1 | | 7/2001 | Wendling et al. | |
| 6,389,999 | B1 | * | 5/2002 | Duello | 111/200 |
| 6,575,104 | B2 | | 6/2003 | Brummelhuis | |
| 7,216,555 | B2 | * | 5/2007 | Drummond et al. | 73/864.45 |
| 7,673,570 | B1 | | 3/2010 | Bassett | |
| 8,544,397 | B2 | * | 10/2013 | Bassett | 111/167 |
| 8,555,798 | B2 | * | 10/2013 | Schilling et al. | 111/163 |
| 8,601,961 | B2 | | 12/2013 | Van Buskirk et al. | |
| 8,634,992 | B2 | * | 1/2014 | Sauder et al. | 701/50 |
| 8,770,308 | B2 | * | 7/2014 | Bassett | 172/2 |
| 2005/0172733 | A1 | * | 8/2005 | Drummond et al. | 73/864.41 |
| 2009/0114406 | A1 | * | 5/2009 | Read | 172/1 |
| 2011/0247843 | A1 | | 10/2011 | Whalen et al. | |
| 2012/0017813 | A1 | | 1/2012 | Van Buskirk et al. | |
| 2012/0060730 | A1 | * | 3/2012 | Bassett | 111/149 |
| 2012/0186503 | A1 | * | 7/2012 | Sauder et al. | 111/134 |
| 2012/0232691 | A1 | * | 9/2012 | Green et al. | 700/231 |
| 2012/0305274 | A1 | * | 12/2012 | Bassett | 172/5 |
| 2013/0032363 | A1 | * | 2/2013 | Curry et al. | 172/4 |
| 2014/0124227 | A1 | * | 5/2014 | Sauder et al. | 172/2 |

* cited by examiner

*Primary Examiner* — Matthew D Troutman
(74) *Attorney, Agent, or Firm* — Ancel W. Lewis, Jr.

(57) ABSTRACT

An electric adjusting apparatus for a row cleaner has a pair of upright posts connected by a pair of parallel linkages, an electric motor with a lead screw and a motor controller. One of the posts mounts on a fertilizing and/or planting apparatus and the row cleaner mounts on the other post. The electric motor moves the parallel linkages to move the row cleaner up and down without tilting. The motor controller controls the electric motor and displays the depth of the row cleaner.

16 Claims, 4 Drawing Sheets

US 9,137,939 B2

ELECTRIC ADJUSTING APPARATUS FOR ROW CLEANERS

TECHNICAL FIELD

The present invention relates to agricultural equipment, and more particularly to an electric apparatus for adjusting the height of a row cleaner.

BACKGROUND ART

Fertilizing and planting at precise depths increases crop yields. Row cleaners clean the row line in front of fertilizing and/or planting apparatus to allow precise depth control. A row cleaner generally has a finger wheel mount, a pair of hubs mounted on the wheel mount and a finger wheel mounted on each hub.

Generally an upwardly projecting square post, with a plurality of vertically spaced holes, is attached to the top of known finger wheel mounts. The post slides into a short square tube mounted on the fertilizing and/or planting apparatus. The square tube has a pair of horizontally aligned holes. The depth of the row cleaner is manually adjusted with a pin through the holes in the tube and through a selected hole in the post. Known devices for automatically adjusting the depth of a row cleaner pivot and tilt the row cleaner.

U.S. Pat. No. 5,497,836 to Groff discloses a row cleaner with finger wheels that angle inwardly and forwardly. U.S. Pat. No. 8,596,375 to Winick et al. discloses a row cleaner with concave finger wheels that are spaced along the direction of travel, that angle inwardly and forwardly, and that angle inwardly and downwardly. The row cleaners of Groff and Winick et al. provide improved row cleaning. However, these row cleaners must be adjusted vertically, without tilting, to maintain equal depth for both finger wheels, and to maintain the forward and downward angles.

DISCLOSURE OF THE INVENTION

An electric apparatus for adjusting the height of a row cleaner includes a support member, spaced, parallel first and second posts, first and second parallel linkages, a motor assembly and a motor controller. The support member mounts on the front of the front of the fertilizing and/or planting apparatus, and the first post mounts on the front of the support member. The first and second parallel linkages each have an upper link and a lower link. One end of the upper and lower links of the first parallel linkage pivotally mounts to one side of the first post and the opposite end pivotally mounts to one side of the second post. One end of the upper and lower links of the second parallel linkage pivotally mounts to the other side of the first post and the opposite end pivotally mounts to the other side of the second post. The motor mounts on the support member and has a forwardly projecting lead screw. The lead screw engages a nut mounted on the lower link of the first linkage, to raise or lower the second post. The controller mounts in the cab of a tractor that pulls the fertilizing and/or planting apparatus, and is electrically connected to the motor. The controller has switches that allow an operator to operate the motor. The wheel mount of the row cleaner is mounted on the lower end of the second post. The motor includes an encoder connected to the controller and the controller converts the signals from the encoder to display the depth of the row cleaner to the operator.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
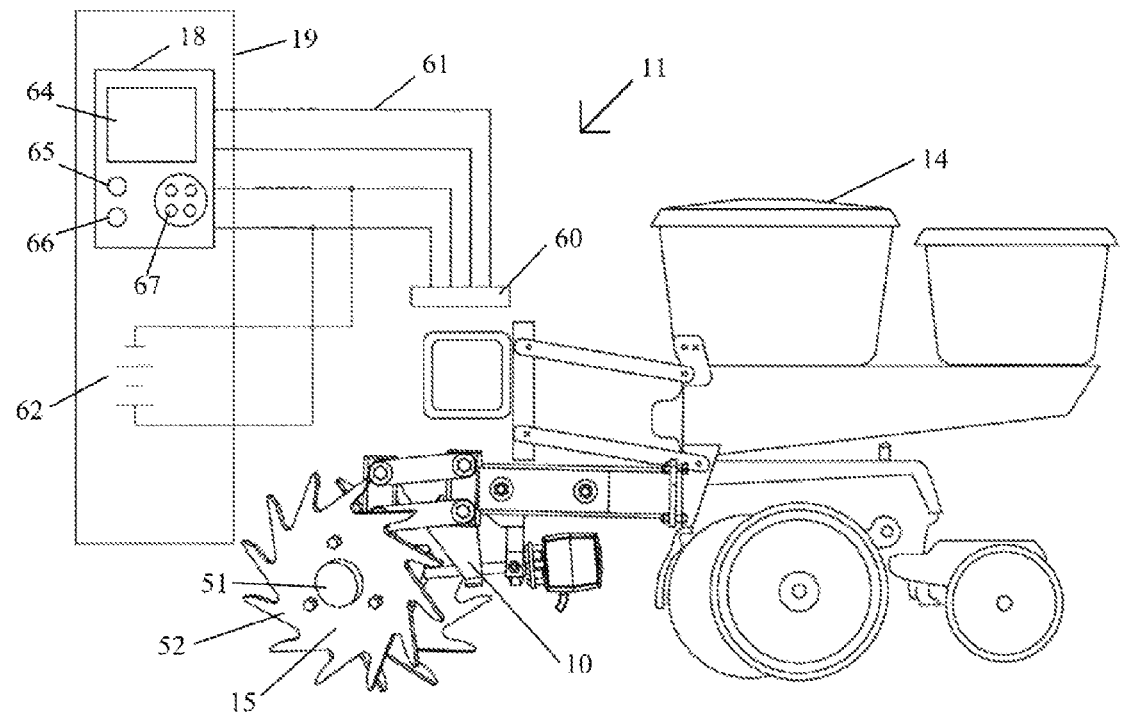
FIG. 1 is a side elevation view of an electric adjusting apparatus for a row cleaner embodying features of the present invention, mounted on a fertilizing and/or planting apparatus.
Figure 2:
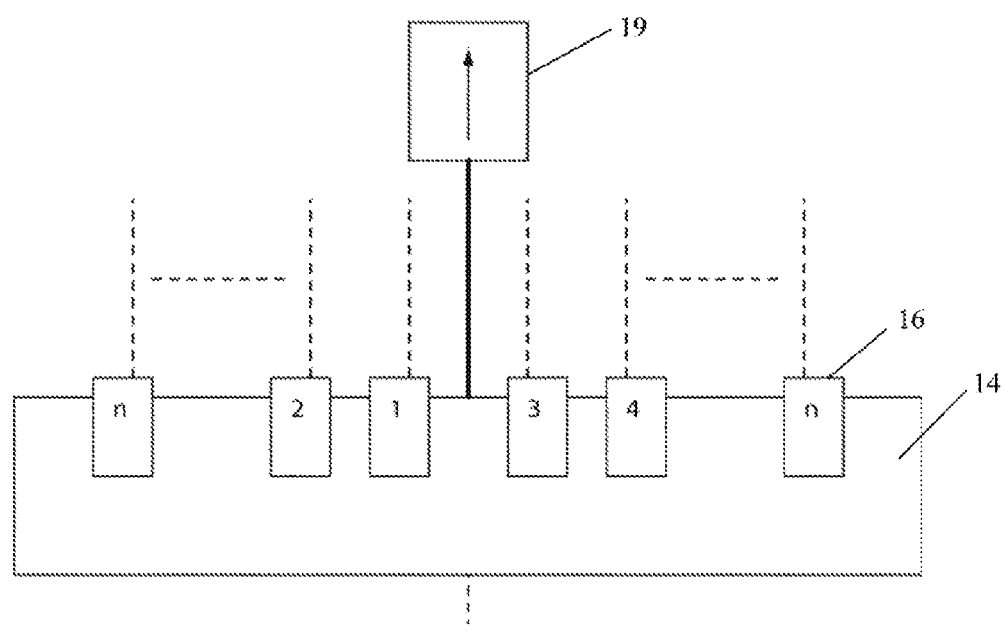
FIG. 2 is a schematic top plan view of the fertilizing and/or planting apparatus of FIG. 1.
Figure 3:
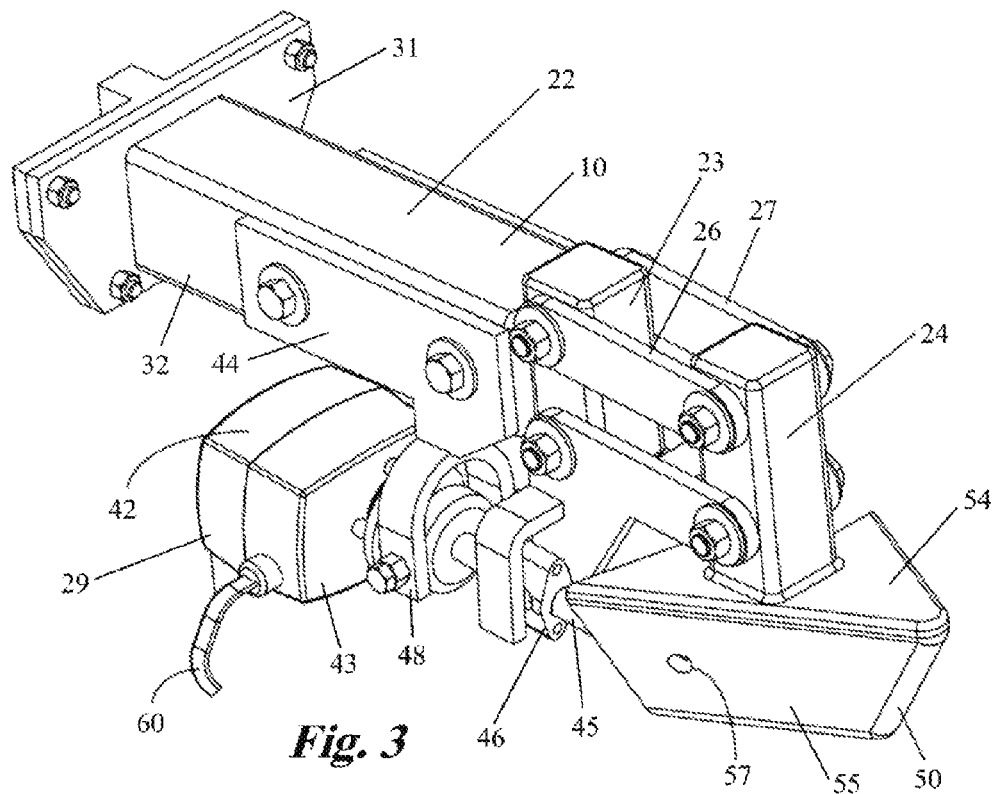
FIG. 3 is a perspective view of the electric adjusting apparatus and row cleaner wheel mount of FIG. 1.
Figure 4:
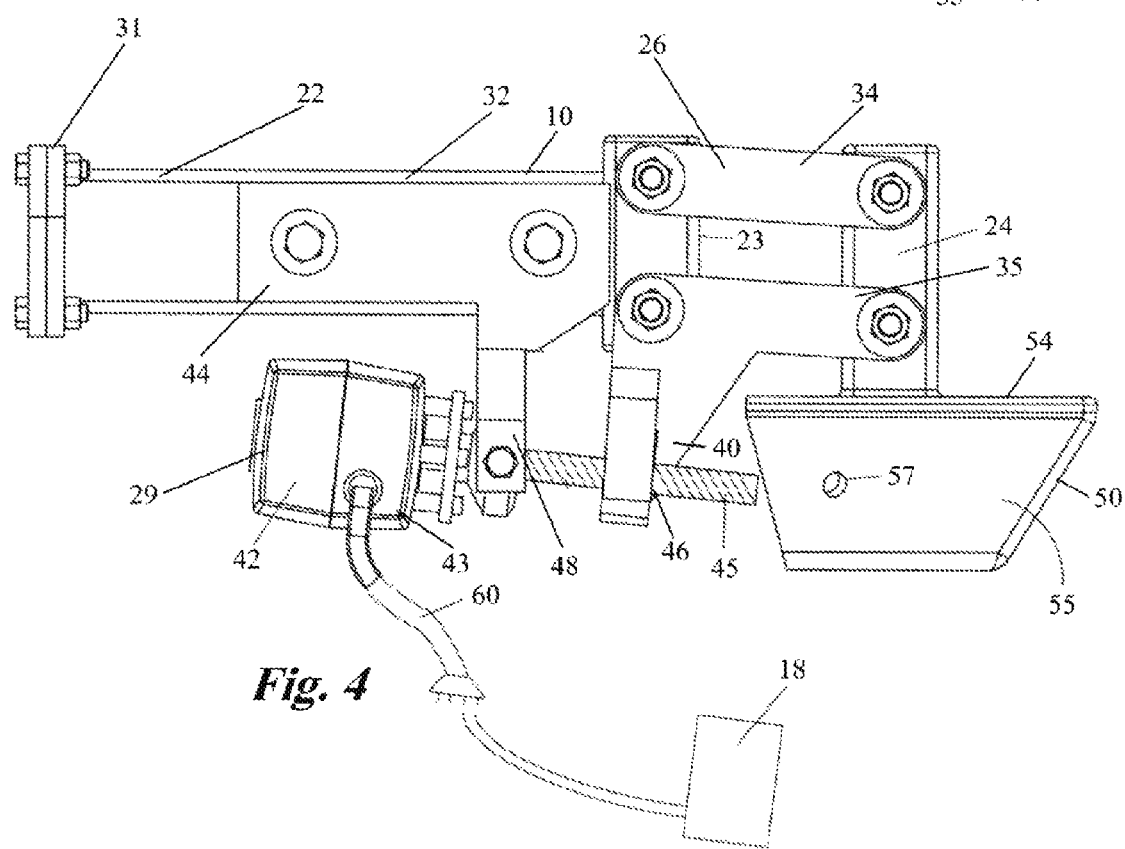
FIG. 4 is a first side elevation view of the electric adjusting apparatus and row cleaner wheel mount of FIG. 1.
Figure 5:
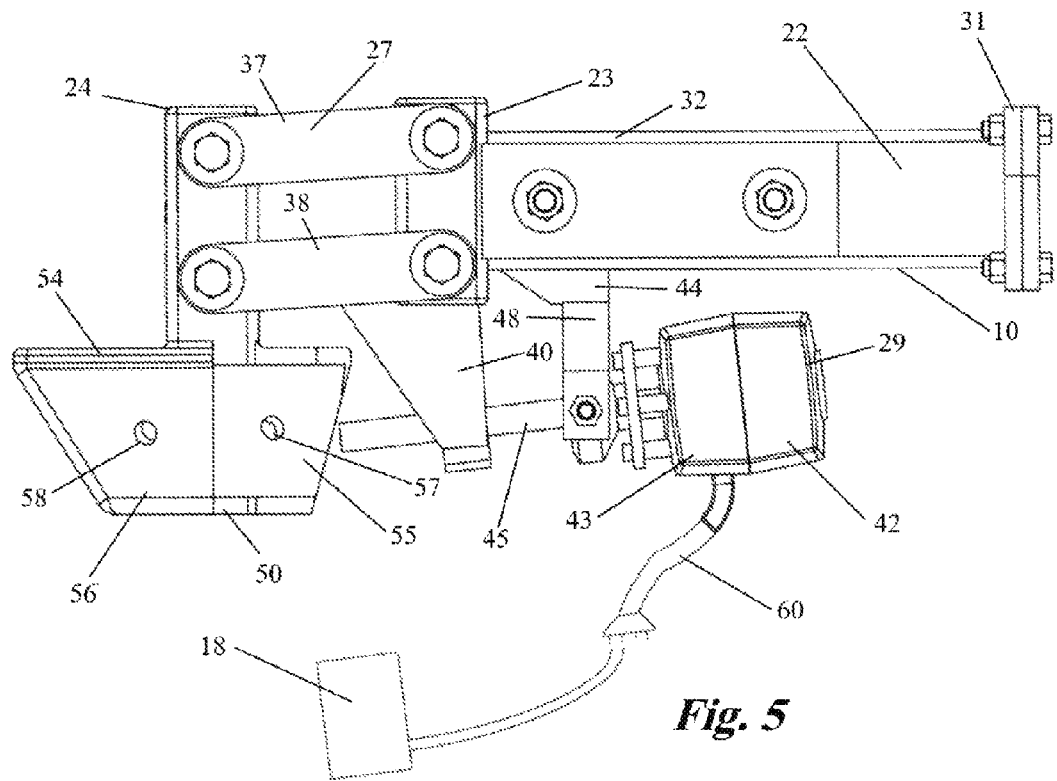
FIG. 5 is a second side elevation view of the electric adjusting apparatus and row cleaner wheel mount of FIG. 1.
Figure 6:
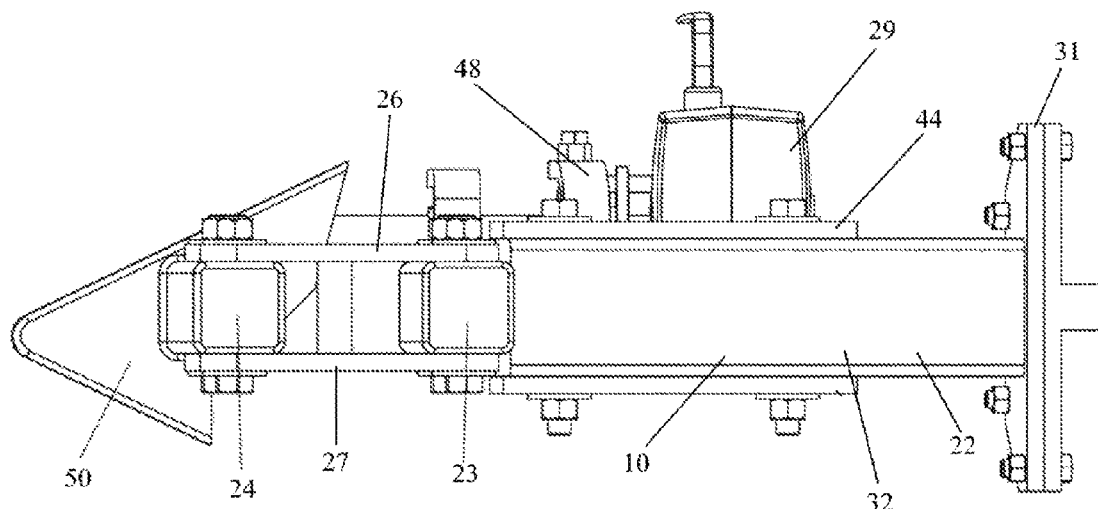
FIG. 6 is a top plan view of the electric adjusting apparatus and row cleaner wheel mount of FIG. 1.
Figure 7:
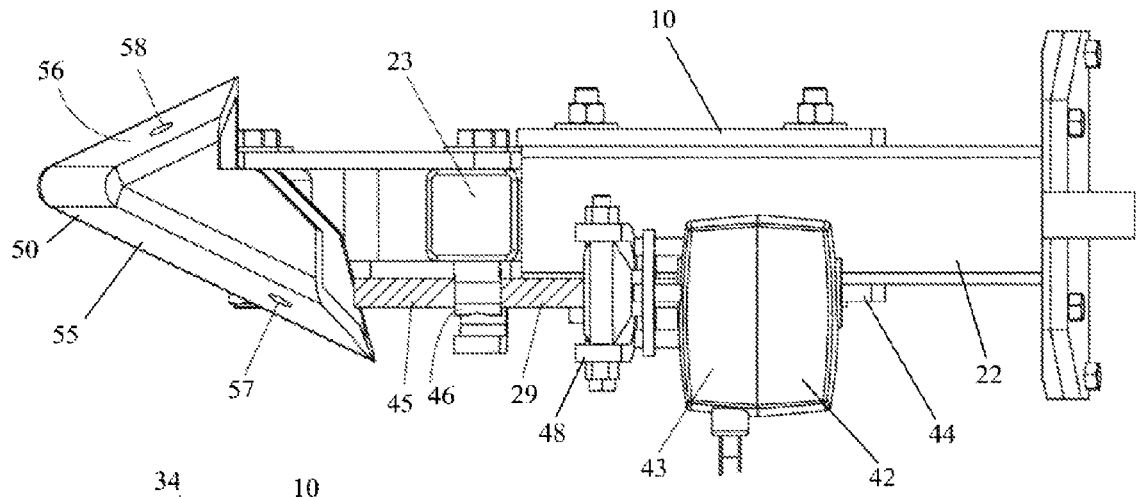
FIG. 7 is a bottom plan view of the electric adjusting apparatus and row cleaner wheel mount of FIG. 1.
Figure 8:
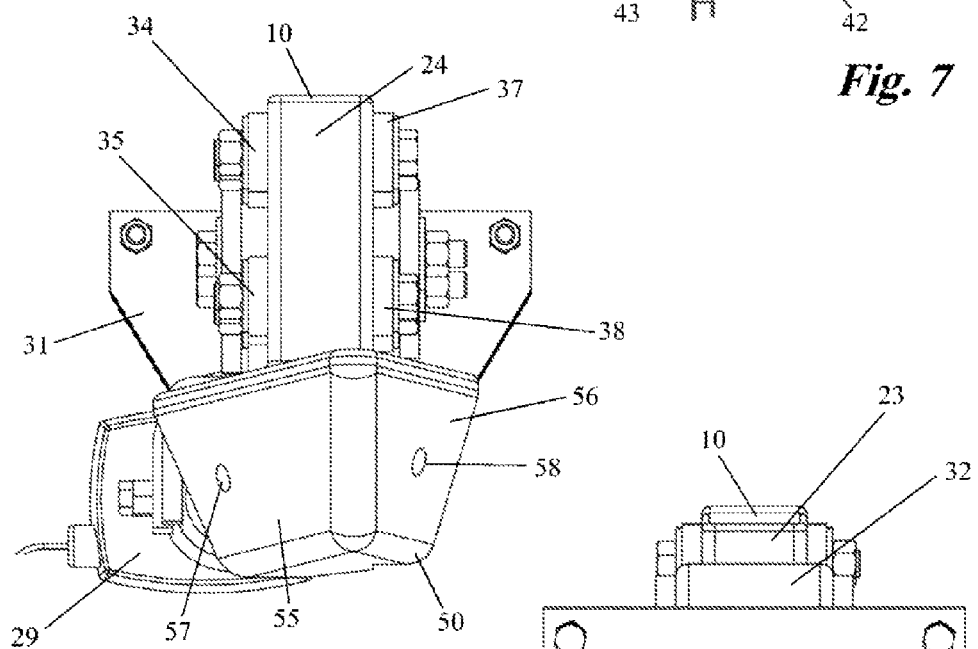
FIG. 8 is a front elevation view of the electric adjusting apparatus and row cleaner wheel mount of FIG. 1.
Figure 9:
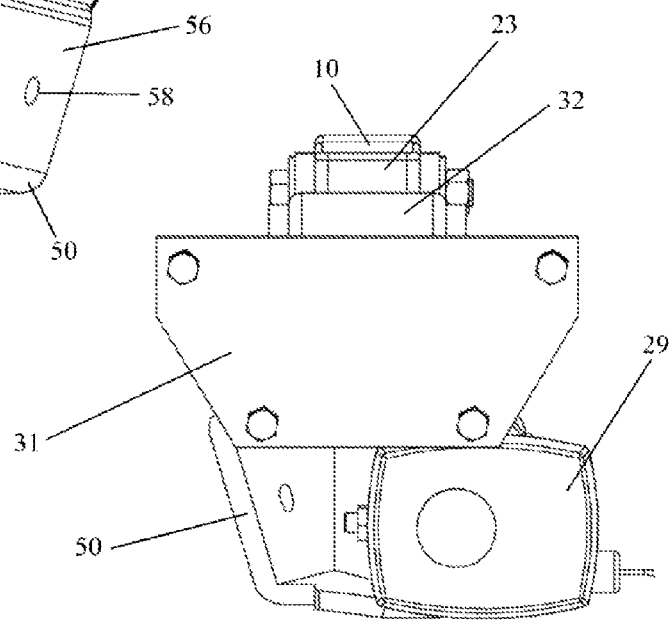
FIG. 9 is a rear elevation view of the electric adjusting apparatus and row cleaner wheel mount of FIG. 1.

Referring to FIGS. 1 and 2, an electric adjusting apparatus 10, embodying features of the present invention, mounts on a fertilizing and/or planting apparatus 14 and a row cleaner 15 mounts on the electric adjusting apparatus 10. As shown in FIG. 2, the fertilizing and/or planting apparatus 14 has a plurality of rows 16 of cleaning, fertilizing and planting devices that each clean, fertilize and/or plant a crop row. The fertilizing and/or planting apparatus 14 can generally have up to 36 rows 16, with the rows 16 on one side of center being mirrors images of the rows on the other side of center. The electric adjusting apparatus 10 and row cleaner 15 shown in FIGS. 1 and 3-9 is for mounting to the left of center on the fertilizing and/or planting apparatus 14. The electric adjusting apparatus 10 includes a motor controller 18 inside the tractor 19, shown schematically in FIG. 1, that pulls the fertilizing and/or planting apparatus 14.

Describing the specific embodiments herein chosen for illustrating the invention, certain terminology is used which will be recognized as being employed for convenience and having no limiting significance. For example, the terms "front", "back", "up", and "down" will refer to the illustrated embodiment in its normal position of use. Further, all of the terminology above-defined includes derivatives of the word specifically mentioned and words of similar import.

Referring to FIGS. 3-9, the electric adjusting apparatus 10 also includes a support member 22, a first post 23, a spaced, parallel second post 24, first and second parallel linkages 26 and 27, and a motor assembly 29. The support member 22 has a flat mounting plate 31 that mounts on the front of the fertilizing and/or planting apparatus 14, and a square tube portion 32 that is rigidly mounted on and projects forwardly from the mounting plate 31. The square tube portion 32 shown slants slightly upwardly. The first post 23 has a substantially square cross section, and rigidly mounts on the front of the square tube portion 32, extending perpendicular to the square tube portion 32.

The first parallel linkage 26 has an elongated upper link 34 and a lower link 35 of equal length. The upper link 34 pivotally mounts at one end to one side of the first post 23, and the lower link 35 pivotally mounts at one end to the same side of the first post 23, spaced below the upper link 34. The second parallel linkage 27 has an elongated upper link 37 and a lower link 38 of equal length. The upper link 37 pivotally mounts at one end to the other side of the first post 23, opposite the upper link 34 of the first parallel linkage 26, and the lower link 38 pivotally mounts at one end to the first post 23, below the upper link 37 and opposite the lower link 35 of the first parallel linkage 26.

The second post 24 has a substantially square cross section. The upper link 34 of the first parallel linkage 26 pivotally mounts, at the end opposite the first post 23, to one side of the second post 24. The lower link 35 of the first parallel linkage 26 pivotally mounts, at the end opposite the first post 23, to the same side of the second post 24, such that the upper and lower links 34 and 35 are parallel. The upper link 37 of the second parallel linkage 27 pivotally mounts, at the end opposite the first post 23, to the other side of the second post 24, opposite the upper link 34 of the first parallel linkage 26. The lower link 38 of the second parallel linkage 27 pivotally mounts, at the end opposite the first post 23, to the second post 24, below the upper link 37 and opposite the lower link 35 of the first parallel linkage 26, such that the upper and lower links 37 and 38 are parallel. The lower link 35 of the first parallel linkage 26 includes a downwardly projecting flange 40.

The motor assembly 29 includes an electric motor 42, an encoder 43, a mounting bracket 44, a lead screw 45 and a lead screw nut 46. The mounting bracket 44 mounts on the side of the square tube portion 32 behind the first parallel linkage 26. The mounting bracket 44 has a downwardly projecting yoke 48 in the shape of an upside down U as seen from the front. The electric motor 42 and the encoder 43 are integrated together and are rotatably mounted in the yoke 48. The lead screw 45 projects forwardly from the electric motor 42 and is driven by the electric motor 42. The lead screw nut 46 is rotatably mounted on the flange 40 on the lower link 35 of the first parallel linkage 26, and is driven forwardly and rearwardly by the lead screw 45.

By way of example, and not as a limitation, the electric motor 42 can be model KZ1121, made by KZValve of Ashland, Nebr. By way of example, and not as a limitation, the lead screw 45 can be a conventional lead screw, a ball screw or a roller screw, with the lead screw nut 46 being the complementary type. The fertilizing and/or planting apparatus 14 is shown in FIG. 1 without a fertilizer disc to more clearly show the electric adjusting apparatus 10. A fertilizer disc and tube can be mounted on a bracket that mounts on the square tube portion 32 behind the first parallel linkage 26, on the side opposite the mounting bracket 44 of the motor assembly 29.

The row cleaner 15 mounts on the lower end of the second post 24. The row cleaner shown in FIGS. 1 and 3-9 has a finger wheel mount 50, a pair of hubs 51 and a pair of finger wheels 52. The finger wheel mount 50 includes a top plate 54, a first plate 55 and second plate 56. The top plate 54 rigidly mounts on the lower end of the second post 24 in substantially horizontal alignment, and has a V shaped forwardly pointing top profile. The first plate 55 extends downwardly, inwardly from one side of the top plate 54, the second plate 56 extends downwardly, inwardly from the other side of the top plate 54, and the first and second plates 55 and 56 converge in front.

The first plate 55 has a first aperture 57 for mounting one of the hubs 51 and the second plate 56 has a second aperture 58 for mounting the other hub 51. The first aperture 57 shown is spaced rearwardly of the second aperture 58. The finger wheels 52 mount on the hubs 51. The finger wheels 52 shown slant inwardly, downwardly and inwardly, forwardly, and the outside finger wheel 52, on the second plate 56, is spaced forwardly from the inside finger wheel 52, on the first plate 55. The first and second apertures 57 and 58 are in the same horizontal plane so that both finger wheels 52 penetrate to the same depth.

Referring again to FIG. 1, the controller 18 is connected to the electric motor 42 by an electrical cable 60. By way of example, and not as a limitation, the controller 18 can be a KZCO model 6990018 from KZValve of Ashland, Nebr. The cable 60 includes four wires 61 that connect from the controller 18 to the electric motor 42. One wire 61 also connects to the positive terminal of the battery 62 of the tractor 19 and one wire 61 also connects to the negative terminal of the battery 62 of the tractor 19. One of the other wires 61 provides a common and the other wire 61 provides signals from the encoder 43 to the controller 18.

The electric adjusting apparatus 10 for all of the row cleaners 15 for all of the rows 16 are connected to the controller 18 and, in combination with the controller 18, are a system 11 for adjusting the row cleaners 15 for a plurality of rows 16 on a fertilizing and/or planting apparatus 14. The controller 18 has a display 64, an up button 65, a down button 66 and a plurality of selection buttons 67. The controller 18 converts the signals from the encoder 43 and displays the depth of the row cleaner 15 on the display 64. The up button 65 moves the row cleaner 15 up and the down button 66 moves the row cleaner 15 down. The selection buttons 67 allow an operator to select the electric adjusting apparatus 10 for any one row 16, or select the electric adjusting apparatus 10 for all of the rows 16, for movement up or down.

The electric adjusting apparatus 10 moves the row cleaner 15 up and down while maintaining the first and second apertures 57 and 58 in the same horizontal plane, allowing the finger wheels 52 to penetrate the ground at the same depth and at the correct angles, and thereby provide the most effective row cleaning. The electric adjusting apparatus 10 provides essentially infinite adjustment of the depth of penetration of the finger wheels 52, and allows for adjustment of individual row cleaners 15 or all of the row cleaners 15.

Although the present invention has been described with a certain degree of particularity, it is understood that the present disclosure has been made by way of example and that changes in details of structure may be made without departing from the spirit thereof.

What is claimed is:

1. An apparatus for adjusting the height of a row cleaner on a fertilizing and/or planting apparatus that is pulled by a tractor, comprising:
   a generally upright first post connected to said fertilizing and/or planting apparatus,
   a second post mounted on said row cleaner,
   a first parallel linkage having an elongated upper link and a spaced, elongated lower link, said upper link pivotally mounting to said first post at one end and pivotally mounting to said second post at an end opposite said first post, said lower link pivotally mounting, below said upper link, to said first post at one end and pivotally mounting to said second post at an end opposite said first post, such that said first and second posts are parallel and said upper and lower links are parallel, said lower link including a downwardly projecting flange, and
   a motor assembly having a motor, a lead screw and a lead screw nut, said motor connected to said first post, said lead screw projecting from said motor, and said lead screw nut threadedly engaging said lead screw and mounting on said flange,
   whereby rotation of said motor moves said flange and thereby adjusts the height of said row cleaner without tilting.

2. The apparatus as set forth in claim 1 including a second parallel linkage spaced laterally from said first parallel linkage and having an elongated upper link and a spaced, elongated lower link, said upper link pivotally mounting to said first post at one end and pivotally mounting to said second post at an end opposite said first post, said lower link pivotally mounting, below said upper link, to said first post at one end and pivotally mounting to said second post at an end opposite said first post, such that said first and second posts are parallel and said upper and lower links are parallel.

3. The apparatus as set forth in claim 1 wherein said motor is an electric motor.

4. The apparatus as set forth in claim 1 including a controller connected to said motor.

5. The apparatus as set forth in claim 4 wherein said controller is in said tractor,
  whereby an operator can adjust the height of said row cleaner while operating said tractor.

6. The apparatus as set forth in claim 4 wherein:
  said motor assembly includes an encoder integrated with said motor and connected to said controller, and
  said controller includes a display that displays the height of said row cleaner from converted signals from said encoder.

7. The apparatus as set forth in claim 1:
  including a support member that mounts on and projects from said fertilizing and/or planting apparatus, and
  wherein said first post mounts on said support member opposite said fertilizing and/or planting apparatus.

8. The apparatus as set forth in claim 7 wherein said motor assembly includes a mounting bracket that mounts on said support member, and said mounting bracket has a downwardly projecting yoke with said motor rotatably mounting on said yoke.

9. The apparatus as set forth in claim 1 wherein said motor is powered by said tractor.

10. An apparatus for adjusting the height of a row cleaner on a fertilizing and/or planting apparatus that is pulled by a tractor, comprising:
  a support member that mounts on and projects from said fertilizing and/or planting apparatus
  a generally upright first post mounted on said support member opposite said fertilizing and/or planting apparatus,
  a second post mounted on said row cleaner,
  a first parallel linkage having an elongated upper link and a spaced, elongated lower link, said upper link pivotally mounting to said first post at one end and pivotally mounting to said second post at an end opposite said first post, said lower link pivotally mounting, below said upper link, to said first post at one end and pivotally mounting to said second post at an end opposite said first post, such that said first and second posts are parallel and said upper and lower links are parallel, said lower link including a downwardly projecting flange,
  a second parallel linkage spaced laterally from said first parallel linkage and having an elongated upper link and a spaced, elongated lower link, said upper link pivotally mounting to said first post at one end and pivotally mounting to said second post at an end opposite said first post, said lower link pivotally mounting, below said upper link, to said first post at one end and pivotally mounting to said second post at an end opposite said first post, such that said first and second posts are parallel and said upper and lower links are parallel,
  a motor assembly having an electric motor, an encoder, a lead screw and a lead screw nut, said motor being mounted on said support member, said lead screw projecting from said motor, and said lead screw nut threadedly engaging said lead screw and mounting on said flange, and
  a controller connected to said motor and said encoder,
  whereby said controller rotates said motor to move said flange and thereby adjust the height of said row cleaner without tilting.

11. A system for adjusting the height of a plurality of row cleaners on a fertilizing and/or planting apparatus that is pulled by a tractor, comprising:
  for each said row cleaner, apparatus for adjusting the height of said row cleaner including:
  a generally upright first post connected to said fertilizing and/or planting apparatus,
  a second post mounted on said row cleaner,
  a first parallel linkage having an elongated upper link and a spaced, elongated lower link, said upper link pivotally mounting to said first post at one end and pivotally mounting to said second post at an end opposite said first post, said lower link pivotally mounting, below said upper link, to said first post at one end and pivotally mounting to said second post at an end opposite said first post, such that said first and second posts are parallel and said upper and lower links are parallel, said lower link including a downwardly projecting flange, and
  a motor assembly having a motor, a lead screw and a lead screw nut, said motor connected to said first post, said lead screw projecting from said motor, and said lead screw nut threadedly engaging said lead screw and mounting on said flange, and
  a controller connected to said motor on each said apparatus for adjusting the height of said row cleaner,
  whereby said controller rotates said motors to move said flanges and thereby adjust the height of said row cleaners without tilting.

12. The system as set forth in claim 11 wherein said controller has a plurality of selection buttons that allow selection for adjustment any selected individual row cleaner and allow selection for adjustment all said row cleaners.

13. The system as set forth in claim 11 wherein each said apparatus for adjusting includes a second parallel linkage spaced laterally from said first parallel linkage and having an elongated upper link and a spaced, elongated lower link, said upper link pivotally mounting to said first post at one end and pivotally mounting to said second post at an end opposite said first post, said lower link pivotally mounting, below said upper link, to said first post at one end and pivotally mounting to said second post at an end opposite said first post, such that said first and second posts are parallel and said upper and lower links are parallel.

14. The system as set forth in claim 11 wherein said motor for each said apparatus for adjusting is an electric motor.

15. The system as set forth in claim 11 wherein said controller is in said tractor,
  whereby an operator can adjust the height of said row cleaners while operating said tractor.

16. The system as set forth in claim 11 wherein:
  said motor assembly for each said apparatus for adjusting includes an encoder integrated with said motor and connected to said controller, and
  said controller includes a display that displays the height of said row cleaners from converted signals from said encoders.

* * * * *